United States Patent
Hrejsa et al.

(10) Patent No.: US 10,247,434 B2
(45) Date of Patent: Apr. 2, 2019

(54) HVAC SYSTEM AND AN HVAC CONTROLLER CONFIGURED TO OPERATE THE HVAC SYSTEM BASED ON AIR POLLUTANT DATA AND USER COMFORT

(71) Applicant: Lennox Industries Inc., Richardson, TX (US)

(72) Inventors: Peter Hrejsa, Frisco, TX (US); Kyle Golden, Plano, TX (US); Kevin Lyons, Flower Mound, TX (US); Jonathan Douglas, Lewisville, TX (US); Thomas Wolowicz, Allen, TX (US); Shailesh Manohar, Irving, TX (US)

(73) Assignee: Lennox Industries Inc., Richardson, TX (US)

( * ) Notice: Subject to any disclaimer, the term of this patent is extended or adjusted under 35 U.S.C. 154(b) by 494 days.

(21) Appl. No.: 14/993,539

(22) Filed: Jan. 12, 2016

(65) Prior Publication Data

US 2016/0209070 A1     Jul. 21, 2016

Related U.S. Application Data

(60) Provisional application No. 62/104,937, filed on Jan. 19, 2015.

(51) Int. Cl.
*F24F 11/30*     (2018.01)
*F24F 11/00*     (2018.01)
(Continued)

(52) U.S. Cl.
CPC .......... *F24F 11/30* (2018.01); *F24F 11/0001* (2013.01); *F24F 2011/0002* (2013.01);
(Continued)

(58) Field of Classification Search
CPC ............... F24F 11/0001; F24F 11/0008; F24F 2011/0002; F24F 2110/20; F24F 2110/50; F24F 2110/64; F24F 2110/65
See application file for complete search history.

(56) References Cited

U.S. PATENT DOCUMENTS 5,428,964 A  *  7/1995  Lobdell ................. G05D 27/02
                                            62/176.6
2008/0014857 A1     1/2008  Spadafora et al.
(Continued)

*Primary Examiner* — Robert Clemente
(74) *Attorney, Agent, or Firm* — Baker Botts L.L.P.

(57) ABSTRACT

According to some embodiments, a heating, ventilating and air conditioning (HVAC) system comprises a circulation fan, one or more humidity sensors operable to sense humidity data associated with an enclosed space, and a controller. In operation, the controller receives the humidity data from the one or more humidity sensors and receives air quality data associated with at least one air pollutant. The controller determines, based on the air quality data, that a threshold associated with the air pollutant has been exceeded and determines, based on the humidity data, that a threshold associated with humidity has not been exceeded. The controller operates the circulation fan in response to determining that the threshold associated with the air pollutant has been exceeded and the threshold associated with humidity has not been exceeded, the circulation fan operated for filtration purposes while not servicing any conditioning demand.

21 Claims, 4 Drawing Sheets

(51) Int. Cl.
*F24F 110/10* (2018.01)
*F24F 110/20* (2018.01)
*F24F 110/50* (2018.01)

(52) U.S. Cl.
CPC ....... *F24F 2110/10* (2018.01); *F24F 2110/20* (2018.01); *F24F 2110/50* (2018.01)

(56) References Cited

U.S. PATENT DOCUMENTS

| | | |
|---|---|---|
| 2010/0106309 A1 | 4/2010 | Grohman et al. |
| 2013/0085001 A1* | 4/2013 | Anderson ............... G06F 1/206 463/46 |
| 2013/0260668 A1 | 10/2013 | Stakutis et al. |
| 2015/0032264 A1 | 1/2015 | Emmons et al. |

* cited by examiner

HVAC SYSTEM AND AN HVAC CONTROLLER CONFIGURED TO OPERATE THE HVAC SYSTEM BASED ON AIR POLLUTANT DATA AND USER COMFORT

TECHNICAL FIELD

This application is directed, in general, to heating, ventilating and air conditioning (HVAC) systems and, more specifically, to improving the indoor air quality of an enclosed space.

RELATED APPLICATIONS

This application claims the benefit of priority of U.S. Provisional Patent Application No. 62/104,937 filed on Jan. 19, 2015.

BACKGROUND

HVAC systems are used to regulate environmental conditions within an enclosed space. Typically, HVAC systems have a circulation fan that pulls air from the enclosed space through ducts and pushes the air back into the enclosed space through additional ducts after conditioning the air (e.g., heating, cooling, humidifying or dehumidifying the air). To direct operations of the circulation fan and other components, each HVAC system includes at least one HVAC controller. A filter is usually used in the HVAC systems to protect the various components, such as the circulation fan and an evaporator coil, by removing impurities or particles from the air received from the enclosed space.

SUMMARY

According to some embodiments, a heating, ventilating and air conditioning (HVAC) system comprises a circulation fan, one or more humidity sensors operable to sense humidity data associated with an enclosed space, and a controller. In operation, the controller receives the humidity data from the one or more humidity sensors and receives air quality data associated with at least one air pollutant. The controller determines, based on the air quality data, that a threshold associated with the air pollutant has been exceeded and determines, based on the humidity data, that a threshold associated with humidity has not been exceeded. The controller operates the circulation fan in response to determining that the threshold associated with the air pollutant has been exceeded and the threshold associated with humidity has not been exceeded, the circulation fan operated for filtration purposes while not servicing any conditioning demand.

Certain embodiments may provide one or more technical advantages. For example, certain embodiments provide an operation scheme for an HVAC system that operates a circulation fan based on both air pollutant data and a humidity level, e.g., a relative humidity level, of an enclosed space. In one embodiment, an HVAC system removes impurities and pollutants from the return air and manages the humidity level within the enclosed space. As such, an HVAC controller reduces the extended runtime of the circulation fan when the HVAC system is in a cooling mode and when the relative humidity of the enclosed space is higher than a desired threshold. In another embodiment, the HVAC system provides ventilation to the enclosed space by removing or diluting indoor pollutants from the return air and by providing fresh air to the space. Thus, the HVAC controller provides a balance between indoor air quality and user comfort. Some embodiments may benefit from some, none, or all of these advantages. Other technical advantages may be readily ascertained by one of ordinary skill in the art.

BRIEF DESCRIPTION

Reference is now made to the following descriptions taken in conjunction with the accompanying drawings, in which.

DETAILED DESCRIPTION

Figure 1:
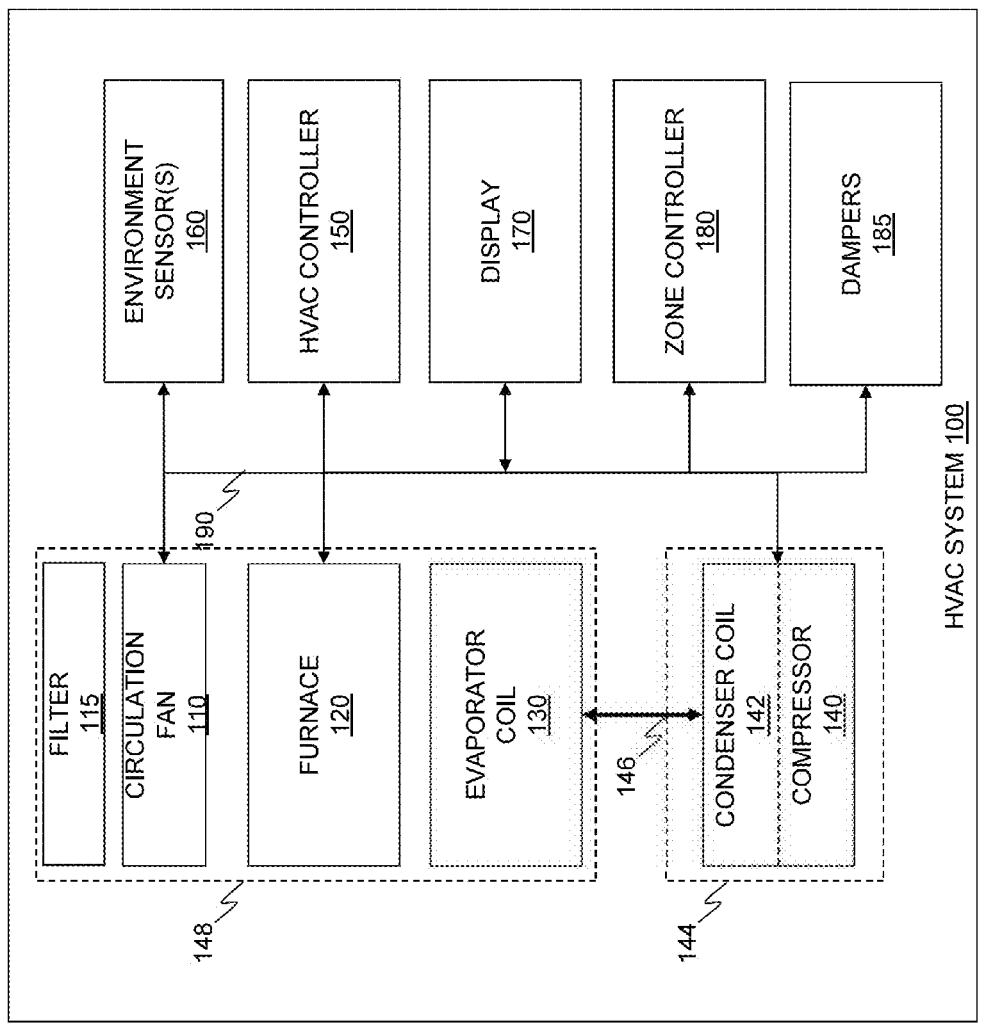
FIG. 1 illustrates a high-level block diagram of an embodiment of an HVAC system constructed according to the principles of the disclosure.

The filter or similar air purifying device in an HVAC system is typically located between a return duct and the conditioning systems or units to filter the return air. In addition to protecting HVAC components, it is realized herein that the filter can also be used to improve the indoor air quality of the enclosed space. This is advantageous since many people suffer from allergies and asthma. Additionally, many others are sensitive to airborne irritants, contaminants or pollutants, such as volatile organic compounds (VOCs) and ozone.

The disclosure recognizes that the amount of particles removed from the return air by the filter of the HVAC system is directly proportional to the volume of air that flows through the filter. Longer circulating fan runtimes will therefore remove more particles from the return air. Longer runtimes can be achieved by running the circulation fan in a continuous fan mode or in a recirculate mode which runs the circulation fan after a conditioning mode, such as a heating mode or a cooling mode, is turned off. Thus, increased run time of the circulation fan can improve the indoor air quality of the enclosed space by removing more of the impurities and pollutants from the return air.

It is further realized herein that when an HVAC system is operating in a cooling mode, increasing the run time of the circulation fan, such as in the continuous mode or recirculation mode, can increase the humidity in the enclosed space. This is due to the existence of airflow across evaporator coils that are cooled and are still wet with unevaporated moisture. An increase in humidity can adversely affect a user's comfort level in the enclosed space as well as contribute to the increase of mold, dust mites and other contaminants that thrive in moist conditions. Accordingly, the disclosure advantageously provides an operation scheme for an HVAC system that operates a circulation fan based on both air pollutant data and a humidity level, e.g., a relative humidity level, of an enclosed space. In one embodiment, an HVAC system is disclosed that removes impurities and pollutants from the return air and manages the humidity level within the enclosed space. As such, an HVAC controller is disclosed that disables or reduces the extended runtime of the circulation fan when the HVAC system is in a cooling mode and when the relative humidity of the enclosed space is higher than a desired threshold.

This disclosure also recognizes that indoor air quality can be improved by employing proper ventilation within an enclosed space. Ventilation replaces stale air within an enclosed space with fresh outdoor air and removes or dilutes air pollutants in doing so. As such, an HVAC system is disclosed that provides ventilation to a space to remove or dilute indoor pollutants and provide fresh air to the enclosed space. An HVAC controller is therefore disclosed that provides a balance between indoor air quality and user comfort.

Air pollutants as used herein are airborne impurities, irritants, particulate matter, contaminants or pollutants, such as VOCs and ozone. The air pollutants include solid particles in the air. Air pollutant data as used herein indicates an amount of pollutant or pollutants within air. The air can be the indoor air of an enclosed space or air external to or outside of the enclosed space. The amount can be at designated levels that correspond to ranges of pollutant contamination within the air. For example, the air pollutant data can report an air pollutant or pollutants to be at designated levels including Low, Moderate, High, Very High and Extreme.

The air pollutant data can be for an installed location of the HVAC system. The air pollutant data can be specific or general for the installed location. For example, the air pollutant data can be directed to the specific location of the installed location or directed to the region of the installed location. As used herein the installed location is the specific location that the system is installed. A zip code can be used to indicate an installed location.

In some embodiments, the air pollutant data is real-time data or current air pollutant data. The HVAC system, therefore, can be configured to operate in view of the existing air pollutant data with respect to the installed location. For example, a source external of or to the HVAC system, i.e., an external source, such as a weather website, can indicate to an HVAC controller of an HVAC system various pollutant levels for the installed location of the HVAC system. In response, the HVAC controller can operate the circulation fan to compensate for a high pollutant level in the local geography. In some embodiments, operating the circulation fan can mean that the controller sends the circulation fan an instruction to turn on.

In some embodiments, the air pollutant data is a forecast. The HVAC system, therefore, can be configured to operate in view of the predicted air pollutant levels with respect to the installed location. For example, the weather website can indicate to the HVAC controller that ragweed will be high tomorrow. In response, the HVAC controller can operate the circulation fan based on this forecast to proactively reduce air pollutants in the enclosed space.

Additionally, the air pollutant data can be historical data. As such, the air pollutant data can be based on a history of air pollutant data for the installed location of the HVAC system. For example, the pollen level for a particular region may be historically high during a certain time of year. An HVAC system in the particular region could proactively employ the historical air pollutant data to provide increased filtration for an enclosed space.

The air pollutant data can also be provided by an air quality sensor or sensors located external to an enclosed space or located within the enclosed space. In some embodiments, the air quality sensors provide quantitative measurements of air pollutants. In other embodiments, the air quality sensors are discrete air quality sensors that detect when a particular pollutant reaches a certain level. In some embodiments, a combination of both quantitative and discrete air quality sensors is used to provide air pollutant data.

In some embodiments, a user can modify the air pollutant data via user input. As such, users could manually increase or decrease the air pollutant data for their own personal comfort. For example, the HVAC system receives air pollutant data that indicates a moderate pollen level. A user, however, is sensitive to pollen and prefers increased filtration. As such, the user can manually increase the pollen level from moderate to high to initiate running of the circulation fan. The HVAC system can then automatically reset to normal operation after a predetermined amount of time. Alternatively, the user or another user could manually reset the HVAC controller. In some embodiments, a user could manually lower the threshold levels that indicate high pollen levels.

Typically, each HVAC system will include an HVAC controller that directs the operations thereof. An HVAC controller may be one or more electric circuit boards including at least one micro-processor or micro-controller integrated circuit. The HVAC controller also includes the support circuitry for power, signal conditioning, and associated peripheral devices. In addition to a processor, the HVAC controller may include a memory having a program or series of operating instruction (i.e., firmware or software) that executes in such a way as to implement the features described herein when initiated by the processor. Additionally, the processor is configured to provide control functionality beyond the scope of the present disclosure.

Turning now to the figures, embodiments of an HVAC system and an HVAC controller that employ or receive air pollutant data to operate the HVAC system are provided. Based on if an outdoor air quality (either by zip code or sensor outside the home) or an indoor air quality level reaches a certain threshold, the disclosed embodiments would trigger a response in the HVAC system such that the fan would automatically run to maximize the filtration in the home. In some embodiments, a user, such as the homeowner, can disable the automatic fan if desired.

FIG. 1 is a high-level block diagram of an embodiment of an HVAC system 100, constructed according to the principles of the disclosure. The HVAC system 100 is a networked HVAC system configured to condition air within an enclosed space, such as a house, an office building, a warehouse, etc. Thus, the HVAC system can be a residential system or a commercial system, such as a roof top system. The HVAC system 100 includes multiple components with a single one of some of the components in FIG. 1 being represented. One skilled in the art will understand that multiple of the same components can be included. One skilled in the art will also understand the HVAC system 100 can include other components that are not illustrated but typically included with an HVAC system.

The HVAC system 100 is a zoned system. As such, multiple environment sensors 160 and dampers 185 are denoted. The HVAC system 100 also includes a circulation fan 110, a furnace 120, typically associated with the circulation fan 110, and a refrigerant evaporator coil 130, also typically associated with the circulation fan 110. The circulation fan 110, furnace 120, and refrigerant evaporator coil 130 are collectively referred to as the "indoor unit." The HVAC system 100 also includes a filter 115 that is located within the indoor unit. This embodiment of the system 100 also includes a compressor 140 and an associated condenser coil 142, which are typically referred to as the "outdoor unit"

144. The compressor 140 and associated condenser coil 142 are typically connected to an associated evaporator coil 130 by a refrigerant line 146.

The circulation fan 110, sometimes referred to as a blower, can operate at different capacities, i.e., motor speeds, to circulate air through the HVAC system 100, whereby the circulated air is conditioned and supplied to the conditioned enclosed space. The circulation fan 110 moves the air through ducts and across the filter 115 at a certain capacity according to a blower volume. The blower volume is the airflow capacity or rate (often expressed in terms of cubic feet per minute, or CFM) of the circulating fan 110.

The HVAC controller 150 is configured to control the circulation fan 110, the furnace 120 and/or the compressor 140 to regulate the environment of the enclosed space, at least approximately. The HVAC controller 150 can also cooperate with the zone controller 180 and the dampers 185 to regulate the environment. As disclosed herein the HVAC controller 150 is configured to control the circulation fan 110 based on both air pollutant data and humidity level within the enclosed space.

The HVAC controller 150 may be an integrated controller or a distributed controller that directs operation of the HVAC system 100. The HVAC controller 150 may include an interface to receive thermostat calls, blower control signals, and blower volumes for various zones and operating modes of the HVAC system. The HVAC controller 150 also includes a processor, such as a microprocessor, to direct the operation of the HVAC system 100. The processor can be configured to direct operation of the HVAC system 100 per air pollutant data received. The HVAC controller 150 may include a memory section having a series of operating instructions stored therein that direct the operation of the HVAC controller 150 (e.g., the processor) when initiated thereby. The series of operating instructions may represent algorithms that are used to control the HVAC system 100 based on the received air pollutant data. The memory or another memory of the HVAC controller 150 is also configured to store the air pollutant data and settings associated therewith for the HVAC system 100.

The HVAC system 100 also includes environment sensors 160 that may be associated with the HVAC controller 150 and also optionally associated with a display 170. The environment sensors 160 provide current information, environmental data, about environmental conditions within zones of the enclosed space, such as temperature, humidity and air quality to the HVAC controller 150 and display 170.

In various embodiments, the display 170 provides additional functions such as operational, diagnostic and status message display and an attractive, visual interface that allows an installer, user or repairman to perform actions with respect to the HVAC system 100 more intuitively. Herein, the term "user" will be used to refer collectively to any of an installer, a tester, a user, an operator, a repairman, etc., unless clarity is served by greater specificity. In some embodiments, the display 170 is a thermostat for the HVAC system 100. In other embodiments, the display 170 is associated with a controller of the HVAC system 100, such as the HVAC controller 150.

The zone controller 180 is configured to manage the movement of conditioned air to the designated zones of the enclosed space. Each of the designated zones include at least one conditioning or demand unit, such as the furnace 120, and at least one user interface, such as a thermostat. The zone controlled HVAC system 100 allows a user to independently control the temperature in the designated zones. The zone controller 180 operates electronic dampers 185 to control air flow to the zones of the enclosed space.

In some embodiments, the zone controller 180 is configured to provide greater or less air flow to compensate for the received air pollutant data. The zone controller 180 can be a conventional controller for delivering conditioned air to designated zones of a conditioned space. Harmony III™ Zone Control System and iHarmony™ Zone Control System available from Lennox Industries, Inc. of Richardson, Tex., are examples of zoning systems that employ a zone controller to manage the distribution of conditioned air to designated zones.

A data bus 190, which in the illustrated embodiment is a serial bus, couples the various components of the HVAC system 100 together such that data may be communicated therebetween or thereamong. In some embodiments, the connections therebetween are through a wired-connection. A conventional cable and contacts may be used to couple the indoor unit controller 150 to the various components. In some embodiments, a wireless connection may also be employed to provide at least some of the connections.

Figure 3:
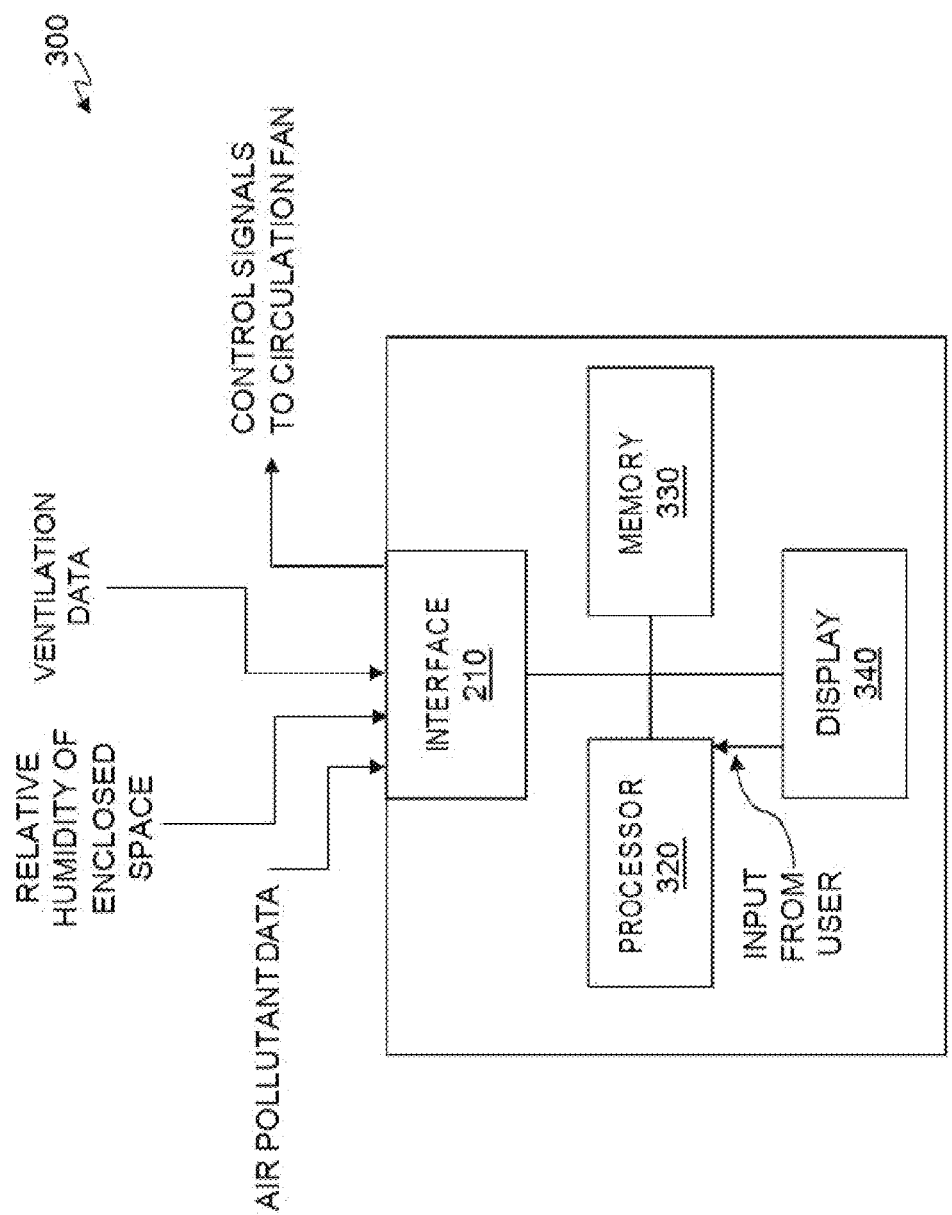
FIG. 3 illustrates a block diagram of an embodiment of a controller constructed according to the principles of the disclosure.

In different embodiments, the HVAC controller 150, the display 170 and the zone controller 180 can be an HVAC controller. As such, either one of the HVAC controller 150, the display 170 or the zone controller 180 can be configured to receive air pollutant data as described herein. FIG. 3 provides additional information of an embodiment of an HVAC controller.

Figure 2:
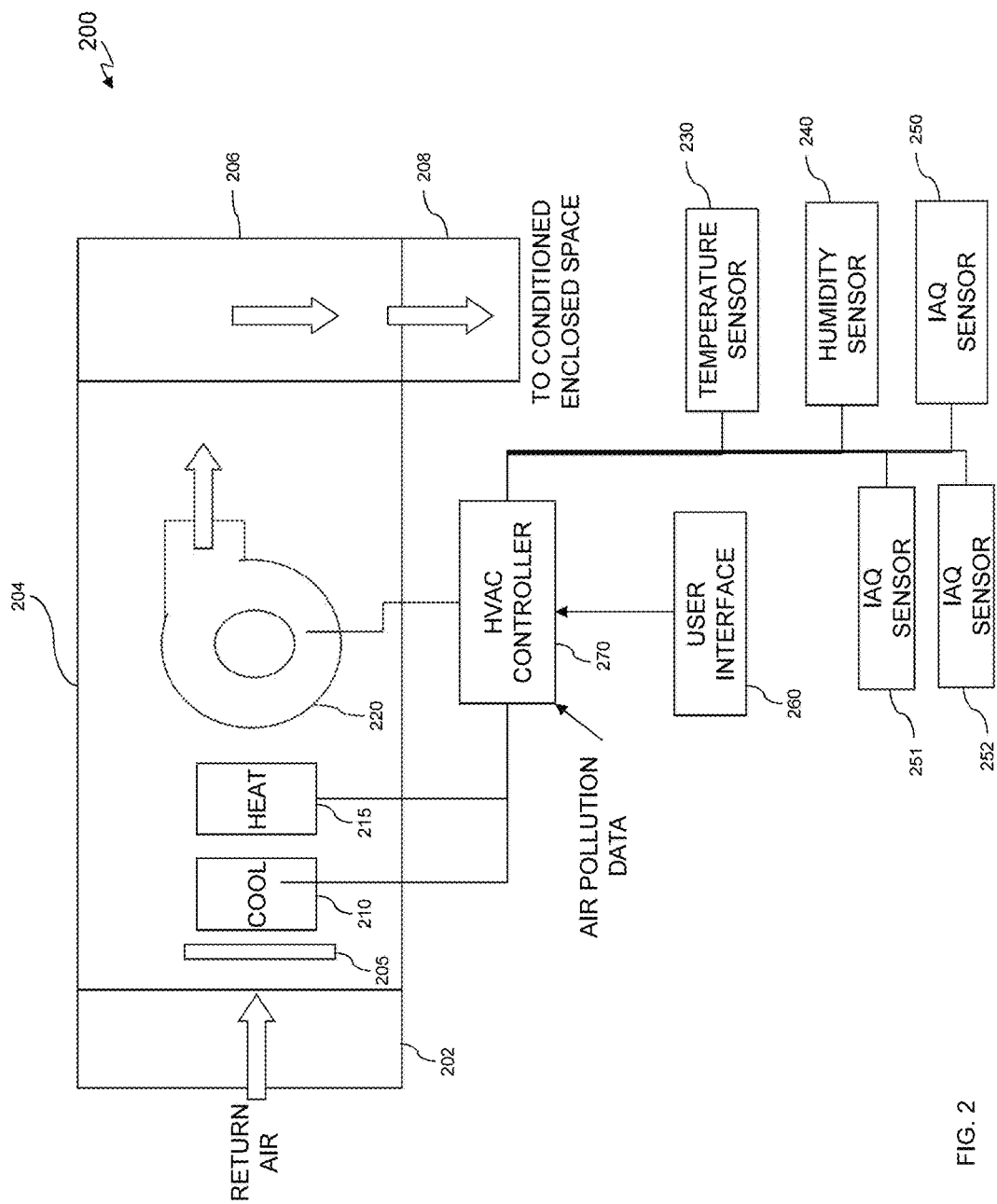
FIG. 2 illustrates a diagram of an embodiment of an HVAC system constructed according to the principles of the disclosure.

Turning now to FIG. 2, illustrated is a block diagram of an embodiment of an HVAC system 200 constructed according to the principles of the disclosure. The HVAC system 200 includes a return duct 202, a return plenum 204, a filter 205, a supply duct 206 and a supply plenum 208. Additionally, the HVAC system 200 includes conditioning systems for cooling and heating air in the enclosed space. The conditioning systems include a cooling system or cooling source 210 and a heating system or heating source 215. The cooling system 210 can include a refrigeration circuit having a compressor system, evaporator coils and condenser coils fluidly coupled together. The cooling system 210 represents a single cooling stage of the HVAC system 200. Given the teachings herein, one skilled in the art will understand that this disclosure also applies to other HVAC embodiments having more than one cooling stage. The heating system 215 can include a gas furnace, electric heating elements, or even a combination thereof. The heating system 215 can also be multi-staged.

The HVAC system 200 also includes a circulation fan 220, a temperature sensor 230, a humidity sensor 240, indoor air quality (IAQ) sensors 250-252, a user interface 260 and an HVAC controller 270. Given the teachings herein, one skilled in the art will also understand that the HVAC system 200 may include additional components and devices that are not presently illustrated or discussed but are typically included in an HVAC system, such as, a power supply, an expansion valve, etc. Some of illustrated components of the HVAC system 200 may be contained within a single enclosure (e.g., a cabinet). In one embodiment, the HVAC system 200 is a rooftop unit.

The cooling system 210, the heating system 215 and the circulation fan 220, sometimes referred to as an indoor air blower, may be conventional devices that are typically employed in HVAC systems. At least some of the operation of the HVAC system 200 can be controlled by the HVAC controller 270 based on inputs from various sensors of the HVAC system 200 including the temperature sensor 230, the humidity sensor 240 and the IAQ sensors 250-252. For example, the HVAC controller 270 can cause the circulation fan 220 to move air across the filter 205 and into the enclosed space based on air pollutant data from one or all of the IAQ sensors 250-252.

The temperature sensor 230 is configured to sense the temperature within the enclosed space and send the sensed temperature to the HVAC controller 270. The humidity sensor 240 is configured to sense the humidity within the enclosed space and send the sensed humidity to the HVAC controller 270. The IAQ sensors 250-252 may be of any type or combination of conventional or later-developed air quality type sensors. The IAQ sensors 250-252 may produce analog or digital values that represent quantitative measurements that the IAQ sensors 250-252 make. If analog, the values may be converted to digital form before being provided to the HVAC controller 270. The HVAC controller 270 then receives the analog or digital values and employs them as an input to one or more response processes. In the illustrated embodiment, the one or more response processes take the form of one or more software programs employable to evaluate the inputs, including their type and the magnitude of their values, and decide upon a correct action, e.g., operating the circulation fan 220, to take in response. The output of the one or more response processes may then be used to control the HVAC system and thereby respond to indoor air quality issues that may arise.

Some HVAC systems may perform ventilation by bringing in outside fresh air when required by code requirements or by demand. Dry contacts (discrete on-off switch) or independent controls along with sensors may be used to determine when a building space needs ventilation. Examples of sensors include IAQ sensors 250-252. In some embodiments, one or more IAQ sensors may be capable of monitoring the concentration levels of VOCs. The IAQ sensors 250-252, along with the temperature sensor 230 and the humidity sensor 240, can be conventional sensors. In some embodiments, instead of or in addition to the air pollutant data that is received from the IAQ sensors 250-252, the air pollutant data is received by the HVAC controller 270 from an external data source, such as ACCU-WEATHER®. In some embodiments, the ventilation requirements may be modified based on the air pollutant data and/or humidity data. In other embodiments, the ventilation requirements may be applied instead of applying the air pollutant data and/or humidity data.

The user interface 260 is configured to be an interface between a user and the HVAC system 200. The user interface 260 can be an HVAC device that has a primary function of communicating between the HVAC system 200 and the user. In some embodiments, the user interface 260 can be a non-HVAC device, such as a smart phone, that includes an application which allows communication between with the HVAC system 200. There may be multiple user interfaces 240 for the HVAC system 200. In some embodiments, the temperature sensor 230 and the user interface 260 can also be conventional devices. In one embodiment, the temperature sensor 230 is a thermostat that also functions as a user interface for the HVAC system 200.

As such, in one embodiment, the user interface 260 includes the temperature sensor 230, a message screen and an alarm annunciator (such as a bell, a public-address speaker, a telephone message generator, or a computer network gateway), is coupled to the HVAC controller 270 and configured to allow a user to select a set point indoor temperature and perhaps a system operational mode (i.e., air conditioning, heating or ventilation) and also display information about the HVAC system 200, including providing alarms and other messages.

The HVAC controller 270 may include a processor, such as a microprocessor, configured to direct the operation of the HVAC system 200. Additionally, the HVAC controller 270 may include an interface and a memory coupled thereto. The interface may include multiple ports for transmitting and receiving external data and data from at least other components or devices of the HVAC system 200, such as the cooling system 210, the heating system 215 and the blower 220. The memory section may be a conventional memory that is constructed to store data and computer programs.

As illustrated in FIG. 2, the HVAC controller 270 is coupled to the various components of the HVAC system 200. In some embodiments, the connections there between are through a wired-connection. A conventional cable and contacts may be used to couple the HVAC controller 270 to the various components of the HVAC system 200 via the controller interface. In other embodiments, a wireless connection may also be employed to provide at least some of the connections.

In one embodiment, the HVAC controller 270 is configured to operate the circulation fan 220 for filtration purposes while not servicing any conditioning demand, while an air pollutant level exceeds a threshold, and the indoor relative humidity remains below a threshold. Thus, the HVAC controller 270 operates the circulation fan 220 based on air pollutant data and a humidity level of the enclosed space.

In one embodiment, the HVAC controller 270 operates the circulation fan 220 for filtration for a determined percentage of time based on a relative humidity in the enclosed space and a fan mode of the circulation fan. Table One below provides an example of the operation time for the circulation fan when the HVAC controller 270 has determined to filtrate based on the air pollutant data and the HVAC system is in a cooling mode.

TABLE ONE

% Hour of Circulation Fan Run Time
Zone Humidity Data when running cooling

| Fan Mode | Relative Humidity Bins | | | | |
|---|---|---|---|---|---|
| | >65 | >60 | >55 | >50 | >45 |
| Auto | 1% | 3% | 11% | 28% | 55% |
| Circulate | 2% | 8% | 19% | 38% | 59% |
| Continuous | 8% | 17% | 32% | 51% | 68% |

Turning now to FIG. 3, illustrated is a block diagram of an embodiment of a controller 300 of an HVAC system constructed according to the principles of the disclosure. The controller 300 is configured to receive air pollutant data for the HVAC system, a humidity level of the enclosed space, an operating mode of the HVAC system and direct operation of the HVAC system accordingly.

The controller 300 includes a communications interface 310, a processor 320, a memory 330 and a user display 340. Additionally, the controller 300 may include additional components typically included within a controller for an HVAC system, such as a power supply or power port. In different embodiments, the controller 300 can be a thermostat or a zone controller of an HVAC system.

In one embodiment, each of the components in the controller 300 is operatively coupled to each other via conventional means to communicate information. While all of the components can be contained in one enclosure, in some embodiments, some of these components may be located outside the enclosure while being operatively coupled to other components. Also in some embodiments, an HVAC system has multiple controllers based on the structure or the number of zones of the enclosed space in which the HVAC system is applied.

The communications interface 310 of the controller 300 serves as an interface between the controller 300 and the HVAC components. The communications interface 310 is configured to receive environmental data such as temperature, humidity, air pollutant data, air quality data, etc., from sensors, such as environment sensors, located throughout the enclosed space and transmit control signals that represent instructions to perform services to the respective HVAC components. The environmental data can be received from environment sensors such as the environment sensors 160 of FIG. 1. Additionally, the environmental data can be received from, for example, the temperature sensor 230, the humidity sensor 240, and the IAQ sensors 250-252 of FIG. 2. In one embodiment, the environmental data and control signals are communicated via a data bus such as the data bus 190 of FIG. 1.

The communications interface 310 is also configured to receive air pollutant data that corresponds to the HVAC system. In one embodiment, the air pollutant data is received from data sources external to the HVAC system via a communications network, such as wired, wireless or a combination thereof. The communications network can be a conventional network that operates according to standard communication protocols.

The communications interface 310 can receive air pollutant data for the geographic region of the installed location or for the installed location of the HVAC system from one or more external data sources that are independent of the HVAC system, including, but not limited to ACCU-WEATHER®, INTELLICAST®, THE WEATHER CHANNEL®, the National Oceanic and Atmospheric Administration (NOAA) National Weather Service, and various local weather services proximate the installation location of the HVAC system. Accordingly, in one embodiment the controller 300 utilizes air pollutant data received for a geographic region proximate the installed location of the HVAC system.

The processor 320 of the controller 300 directs the operation of the controller 300 and instructs other HVAC components such as a circulation fan and a ventilator. The processor 320 may be a conventional processor such as a microprocessor. The processor 320 activates or brings on the circulating fan for filtration purposes when air pollutant levels, such as a pollen level, exceeds a threshold, and the indoor relative humidity remains below a threshold. The processor 320 operates the circulation fan for filtration while not servicing any conditioning demand, such as cooling or heating. In one embodiment, the processor 320 employs a relative humidity measurement of the enclosed space and a current conditioning mode of the HVAC system to operate the circulation fan for filtration. The processor 320 is also configured to employ a dehumidification set point that can be set by a user employing, for example, the display 340. The user interface 260 of FIG. 2 is another device that a user can employ to provide a dehumidification set point. In some embodiments, the dehumidification set point is based on the region in which the HVAC system is installed and is set by the manufacturer or installer. A user can also select to enable or disable the air filtration scheme employing, for example, the display 340 or the user interface 260.

The processor 320 may also activate a ventilator for ventilation purposes. The ventilator is activated when the system determines that a ventilation demand has not been met based on ventilation data received by the system. The ventilation demand of the system reflects the need to ventilate the enclosed space based on indoor pollutants or code requirements. In some embodiments, a user can modify the ventilation demand via user input. In other embodiments, the ventilation demand is based on code requirements and/or regulations.

In addition to the air pollutant data, the processor 320 is configured to run the circulation fan for filtration based on the active conditioning mode of the HVAC system. For a cooling mode, the processor 320 operates the circulation fan at a continuous blower speed until the relative humidity increases to a predetermined threshold. In one embodiment, the predetermined threshold is a known percentage above a dehumidification set point of the HVAC system. For example, an increase of half of a percent above the dehumidification set point can cause the processor 320 to turn off the circulation fan. If there is no dehumidification set point, then the processor 320 can assume a set point. For example, in some embodiments, the processor 320 can assume a set point of sixty-five percent.

In one embodiment, the processor 320 is configured to run the circulation fan at a continuous blower speed until air pollutant data indicates a decrease in a pollutant level. The decrease could be for multiple of the pollutants being monitored, including all, or for just one of the pollutants. For example, a user can direct the processor 320 via a user interface to control the filtration process based on one particular pollutant. Alternatively, multiple pollutants can be selected by a user.

The processor 320 can also be configured to run the circulation fan at a continuous blower speed for filtration until receiving a conditioning demand requiring servicing. The conditioning demand can be received as in a conventional HVAC system.

The air pollutant level can be for a single type of pollutant or for multiple types of pollutants. In some embodiments, a single type of pollutant can be monitored, such as pollen. In other embodiments, multiple varieties of that particular type of pollutant are monitored. For example, pollen levels from grass, ragweed, mold and trees can be individually reported. Additionally, an overall pollen level can be reported. The air pollutant data for these pollutants can be received from an external source or received from air quality sensors located within or outside of the enclosed space.

The memory 330 may be a conventional memory typically located within the controller, such as a microcontroller, that is constructed to store the programming data. The memory 330 may store operating instructions such as control signals to direct the operation of the processor 320 when initiated thereby. The operating instructions may correspond to algorithms that provide the functionality of the operating schemes disclosed herein.

The display 340 visually provides information to a user and allows interaction with the user. In one embodiment, the display 340 can provide an interface screen that allows the user to modify the air pollutant data. In another embodiment, the display 340 includes buttons that allow a user to manipulate content, such as air pollutant data or ventilation data, provided by the display 340. The display 340 can also be configured to allow a user to enable or disable the filtration scheme and modify the threshold levels triggering the filtration process or ending the filtration process.

The display 340 can also provide messages to a user based on the filtration process and directions from the processor 320. For example, if there is no decrease in air pollutant levels after a determined amount of time, the display 340 can provide a message such as, "CHECK FOR OPEN DOORS OR WINDOWS" based on filtration time and air pollutant levels. The processor 320 can also track specific pollutants and provide a message recommending a type of filter for the specific pollutants. In some embodiments, the display 340 can provide a graph of the various pollutants in the enclosed space. Additionally, a comparison before or after filtration can be provided and a total amount of filtered pollutants per a specific amount of time, e.g., per hour, day, week. This reporting data can be used to indicate that a filter change is needed or will be needed at an estimated time. As such, a filter change can be recommended based on actual data as opposed to time.

Figure 4:
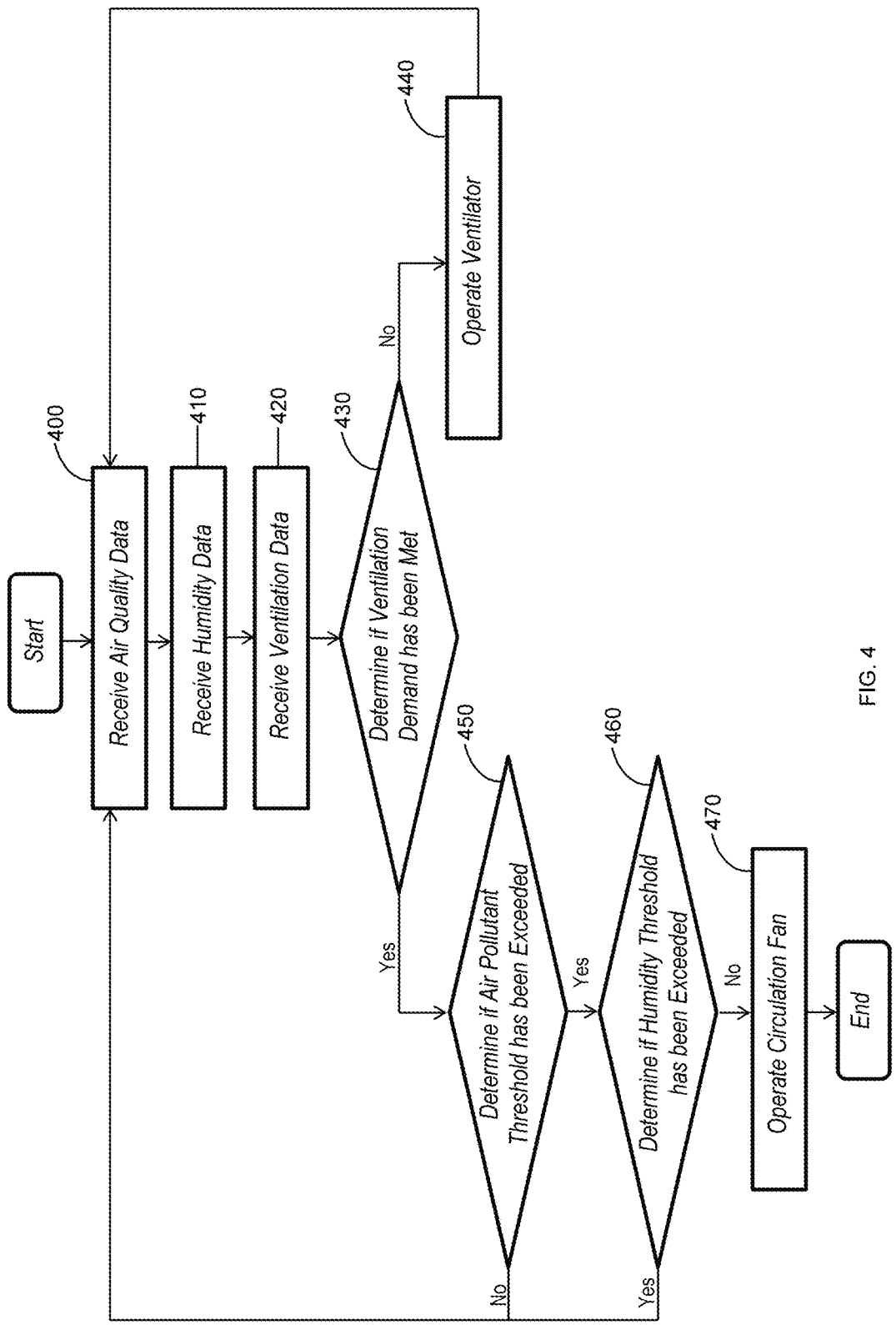
FIG. 4 is a flow diagram of a method of operating an HVAC system carried out according to the principles of the disclosure.

FIG. 4 is an example method in an HVAC system for improving air quality of an enclosed space. At step 400, the system receives air quality data associated with the enclosed space. As an example, the air quality data may be received from a sensor associated with the enclosed space. As another example, the air quality data may be received from source external to the HVAC system, such as a weather website. In certain embodiments, the source external to HVAC system may provide air quality data for a zip code associated with the enclosed space. The air quality data may comprise real-time (current) data, forecasted data, and/or historical data. The air quality data is associated with at least one air pollutant, such as volatile organic compounds, ozone, particulate matter, grass pollen, ragweed pollen, mold pollen, tree pollen, or overall pollen. Particulate matter as used herein refers to a mixture of small, minute particles suspended in the air. Particulate matter is generally made up of number of components, including acids, organic chemicals, metals, and soil or dust particles. Examples of particulate matter include emissions from candles, air fresheners and forest fires, but particulate matter can also form when gases emitted from automobiles, power plants, etc. react in the air.

At step 410, the system receives humidity data associated with the enclosed space. As an example, the humidity data may be received from a sensor associated with the enclosed space.

At step 420, the system receives ventilation data associated with the enclosed space. The ventilation data may be received from an IAQ sensor associated with the enclosed space or from an external data source such as ACCU-WEATHER®.

At step 430, the system determines, based on the ventilation data, whether the ventilation demand has been met. In one embodiment, the ventilation demand is received from a user interface in response to a user's personal comfort. In another embodiment, the ventilation demand is preset based on code requirements or regulations. If in step 430 the system determines that the ventilation demand has not been met, the system continues to step 440. If however, in step 430 the system determines that the ventilation demand has been met, the system continues to step 450.

At step 440, the system operates a ventilator in response to determining that the ventilation demand has not been met. The ventilator is operated to remove or dilute indoor air pollutants and to provide fresh air into the enclosed space. In one embodiment, the ventilator that is operated is climate conscious such as the Healthy Climate® ventilation systems manufactured by Lennox International Inc.® After the ventilator reaches the ventilation demand, the system returns to step 400 to receive air quality data associated with the enclosed space.

If the system determines that the ventilation demand has been met in step 430, the system continues to step 450. At step 450, the system determines, based on the air quality data, that a threshold associated with the air pollutant has been exceeded. In one embodiment, the air pollutant threshold is predetermined. In another embodiment, the air pollutant threshold is received from a user interface in response to a user's personal comfort. If in step 450 the system determines that the air pollutant threshold has not been exceeded, the system returns to step 400 to receive air quality data associated with the enclosed space. However, if in step 450 the system determines that the air pollutant threshold has been exceeded, then it continues to step 460.

At step 460, the system determines, based on the humidity data, that a threshold associated with humidity has not been exceeded. In one embodiment, the humidity threshold is predetermined and is a known percentage above a dehumidification set point of the HVAC system. In another embodiment, the humidity threshold is received from a user interface in response to a user's personal comfort. If in step 460 it is determined that the humidity threshold has been exceeded, the system returns to step 400 to receive air quality data associated with the enclosed space. If however in step 460 it is determined that the humidity threshold has not been exceeded, the system proceeds to step 470.

At step 470, the system operates a circulation fan in response to determining that the threshold associated with the air pollutant has been exceeded and the threshold associated with humidity has not been exceeded, the circulation fan is operated for filtration purposes while not servicing any conditioning demand. Thus, the circulation fan is turned on for filtration purposes when the HVAC system receives information that the air pollutant threshold has been exceeded and the humidity threshold has not been exceeded within the enclosed space.

The above-described apparatuses, methods or interface screens may be embodied in, provide by or performed by various conventional digital data processors, microprocessors or computing devices, wherein these devices are programmed or store executable programs of sequences of software instructions to perform one or more of the steps of a method or provide an interface screen. The software instructions of such programs may be encoded in machine-executable form on conventional digital data storage media that is non-transitory, e.g., magnetic or optical disks, random-access memory (RAM), magnetic hard disks, flash memories, and/or read-only memory (ROM), to enable various types of digital data processors or computing devices to perform one, multiple or all of the steps of one or more of the above-described methods or to provide one of the described interface screens. Additionally, an apparatus, such as an HVAC controller, may be designed to include the necessary circuitry or programming to perform each step of a method as disclosed herein or provide a single user interface as disclosed.

Portions of disclosed embodiments may relate to computer storage products with a non-transitory computer-readable medium that have program code thereon for performing various computer-implemented operations that embody a part of an apparatus, system, carry out the steps of a method set forth herein or provide a single user interface screen as disclosed. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

The invention claimed is:

1. A heating, ventilating and air conditioning (HVAC) system operable to condition an enclosed space, the HVAC system comprising:
   a circulation fan;
   one or more humidity sensors, the humidity sensors operable to sense humidity data associated with the enclosed space; and
   a controller operable to:
      receive air quality data associated with at least one air pollutant, the air quality data received from a source external to the HVAC system or from one or more air quality sensors operable to sense air quality data associated with the enclosed space;
      receive the humidity data from the one or more humidity sensors;
      determine, based on the air quality data, that a threshold associated with the air pollutant has been exceeded;
      determine, based on the humidity data, that a threshold associated with humidity has not been exceeded; and
      operate the circulation fan in response to determining that the threshold associated with the air pollutant has been exceeded and the threshold associated with humidity has not been exceeded, the circulation fan operated for filtration purposes while not servicing any conditioning demand.

2. The system of claim 1, wherein said air pollutant comprises one of:
   volatile organic compounds;
   ozone;
   particulate matter;
   grass pollen;
   ragweed pollen;
   mold pollen;
   tree pollen; or
   overall pollen.

3. The system of claim 1, further comprising a user interface adapted to receive user input, wherein the controller is further operable to select the threshold associated with the air pollutant, the threshold associated with humidity, or both based on the user input.

4. The system of claim 1, wherein the humidity data comprises the relative humidity within the enclosed space.

5. The system of claim 1, wherein the controller is further operable to cease operating the circulation fan for filtration purposes in response to determining that the threshold associated with humidity has been exceeded.

6. The system of claim 1, wherein the controller is further operable to receive a conditioning demand and, in response, operate the circulation fan according to a procedure for servicing the conditioning demand.

7. The system of claim 1, wherein the controller is further operable to:
   determine a total amount of filtered pollutants; and
   report when a filter change is needed based on the total amount of filtered pollutants.

8. A method in a heating, ventilating and air conditioning (HVAC) system for improving air quality of an enclosed space, comprising:
   receiving air quality data associated with the enclosed space, said air quality data associated with at least one air pollutant;
   receiving humidity data associated with the enclosed space;
   determining, based on the air quality data, that a threshold associated with the air pollutant has been exceeded;
   determining, based on the humidity data, that a threshold associated with humidity has not been exceeded; and
   operating a circulation fan in response to determining that the threshold associated with the air pollutant has been exceeded and the threshold associated with humidity has not been exceeded, the circulation fan operated for filtration purposes while not servicing any conditioning demand.

9. The method of claim 8, wherein said air pollutant comprises one of:
   volatile organic compounds;
   ozone;
   particulate matter;
   grass pollen;
   ragweed pollen;
   mold pollen;
   tree pollen; or
   overall pollen.

10. The method of claim 8, wherein the threshold associated with the air pollutant is selected based on user input.

11. The method of claim 8, wherein the threshold associated with humidity is selected based on user input.

12. The method of claim 8, wherein the air quality data is received via sensors associated with the enclosed space.

13. The method of claim 8, wherein the air quality data is received via a source external to the HVAC system.

14. The method of claim 8, wherein the humidity data comprises the relative humidity within the enclosed space.

15. The method of claim 8, further comprising ceasing operating the circulation fan for filtration purposes in response to determining that the threshold associated with humidity has been exceeded.

16. The method of claim 8, further comprising receiving a conditioning demand and, in response, operating the circulation fan according to a procedure for servicing the conditioning demand.

17. The method of claim 8, further comprising:
   determining a total amount of filtered pollutants; and
   reporting when a filter change is needed based on the total amount of filtered pollutants.

18. A controller for a heating, ventilating and air conditioning (HVAC) system, the controller comprising one or more processors and logic encoded in non-transitory computer readable memory, the logic, when executed by the one or more processors, operable to:

receive air quality data associated with an enclosed space, said air quality data associated with at least one air pollutant;

receive humidity data associated with the enclosed space;

determine, based on the air quality data, that a threshold associated with the air pollutant has been exceeded;

determine, based on the humidity data, that a threshold associated with humidity has not been exceeded; and operate a circulation fan in response to determining that the threshold associated with the air pollutant has been exceeded and the threshold associated with humidity has not been exceeded, the circulation fan operated for filtration purposes while not servicing any conditioning demand.

19. The controller of claim 18, further operable to cease operating the circulation fan for filtration purposes in response to determining that the threshold associated with humidity has been exceeded.

20. The controller of claim 18, further operable to receive a conditioning demand and, in response, operate the circulation fan according to a procedure for servicing the conditioning demand.

21. The controller of claim 18, further operable to operate a ventilator in response to a determination that a ventilation demand has not been met.

* * * * *